United States Patent
Gutman et al.

(10) Patent No.: US 7,137,018 B2
(45) Date of Patent: Nov. 14, 2006

(54) ACTIVE STATE LINK POWER MANAGEMENT

(75) Inventors: Michael Gutman, Zichron-Yaacoy (IL); Alon Naveh, Ramat Hasharon (IL); Andrew W. Martwick, Folsom, CA (US); Gary A. Solomon, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 569 days.

(21) Appl. No.: 10/335,111

(22) Filed: Dec. 31, 2002

(65) Prior Publication Data

US 2004/0128576 A1    Jul. 1, 2004

(51) Int. Cl.
*G06F 1/32* (2006.01)
*H04L 5/14* (2006.01)

(52) U.S. Cl. .............. 713/323; 713/320; 370/276

(58) Field of Classification Search .............. None
See application file for complete search history.

(56) References Cited

U.S. PATENT DOCUMENTS

| | | | |
|---|---|---|---|
| 5,151,977 A | | 9/1992 | Fredericks et al. |
| 6,125,449 A | * | 9/2000 | Taylor et al. ............ 713/310 |
| 6,601,178 B1 | * | 7/2003 | Gulick .................. 713/322 |
| 6,694,442 B1 | * | 2/2004 | Yeh ...................... 713/322 |
| 6,754,692 B1 | * | 6/2004 | Cruz ..................... 709/203 |

OTHER PUBLICATIONS

PCI Express, Base Specification Revision 1.0, Jul. 22, 2002, PCI Express, pp. 1-8, and 259-310.

* cited by examiner

*Primary Examiner*—Lynne H. Browne
*Assistant Examiner*—Anand B. Patel
(74) *Attorney, Agent, or Firm*—Blakely, Sokoloff, Taylor & Zafman LLP

(57) ABSTRACT

A distributed power management system for a bus architecture or similar communications network. The system supports multiple low power states and defines entry and exit procedures for maximizing energy savings and communication speed.

39 Claims, 12 Drawing Sheets

ACTIVE STATE LINK POWER MANAGEMENT

BACKGROUND

(1) Field of the Invention

The invention relates to power management of networked devices. Specifically, this invention relates to power management for bus architectures.

(2) Background

Power management in modern computer systems plays an important part in conserving energy, managing heat dissipation, and improving system performance. Modern computers systems are increasingly designed to be used in settings where a reliable external power supply is not available making power management to conserve energy important. Even when reliable external power supplies are available careful power management within the computing system can reduce heat produced by the system enabling improved performance of the system. Computing systems generally have better performance at lower ambient temperatures because key components can run at higher speeds without damaging their circuitry. Many computing platforms are constrained by heat dissipation issues including dense servers, DT computers and mobile computers. For mobile computers, energy conservation is especially important to conserve battery power.

Power management can also reduce the operating costs of a computing system by reducing the amount of energy consumed by a device while in operation. Components of a computer system can be powered down or put in a sleep mode that requires less power than active operation. Computer monitors are often placed in a sleep mode when an operating system detects that the computer system has not received any input from a user for a defined period of time. Other system components can be placed in a sleep or powered down state in order to conserve energy when the components are not in use. The computer system monitors input devices and wakes devices as needed.

For example, a PCI bus uses a centralized mechanism to determine if the bus is not needed which involves all other devices verifying that they do not need the bus. This system is implemented using out-of-band signaling, thus requiring specialized communication lines in addition to data lines. When the bus is determined not to be needed then the common clock signal is no longer transmitted.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
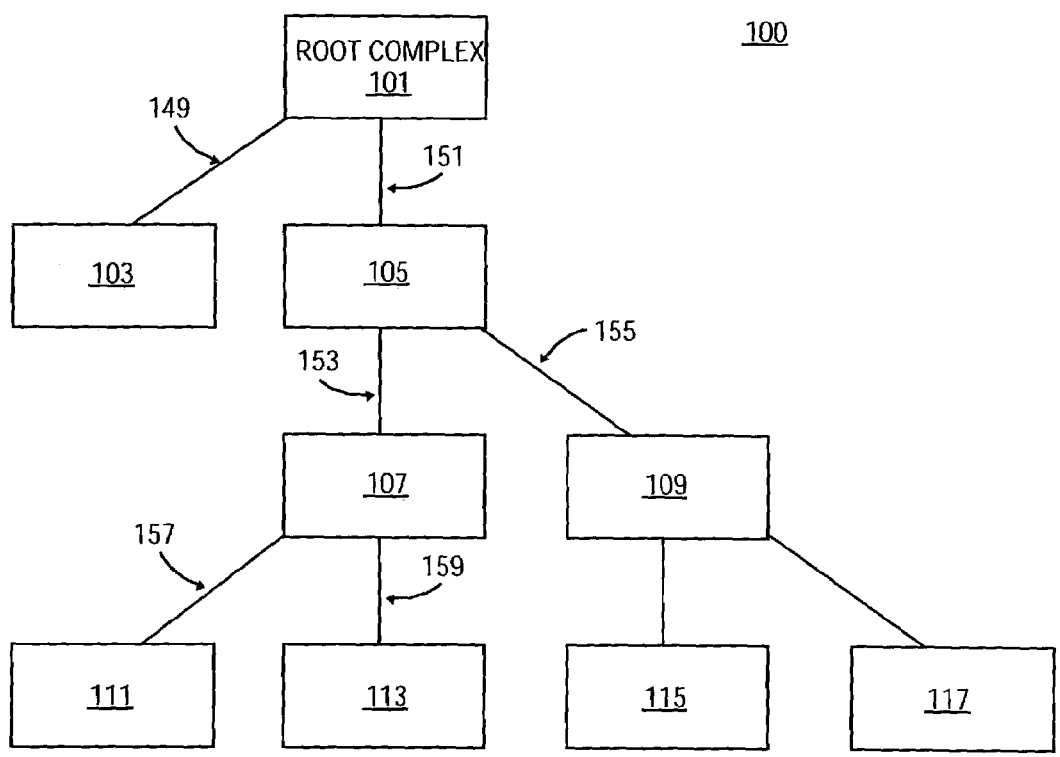
FIG. 1 is a block diagram of a communication link network.

FIG. 1 is a block diagram of an exemplary topology of a communications network. In one embodiment, network 100 includes a root complex 101 that is at the top of the tree type network 100. Endpoints 103, 111, 113, 115 and 117 represent network devices or resources that communicate over network 100. Intermediate nodes 105, 107 and 109 represent switches or similar network devices for routing data between the endpoints themselves and between the endpoints and root complex 101. Communication channels or 'links' 151, 153, 155, 157 and 159 allow the devices at each end to transmit and receive data between them. In one embodiment, network 100 is a set of high speed serial interconnects.

Figure 2:
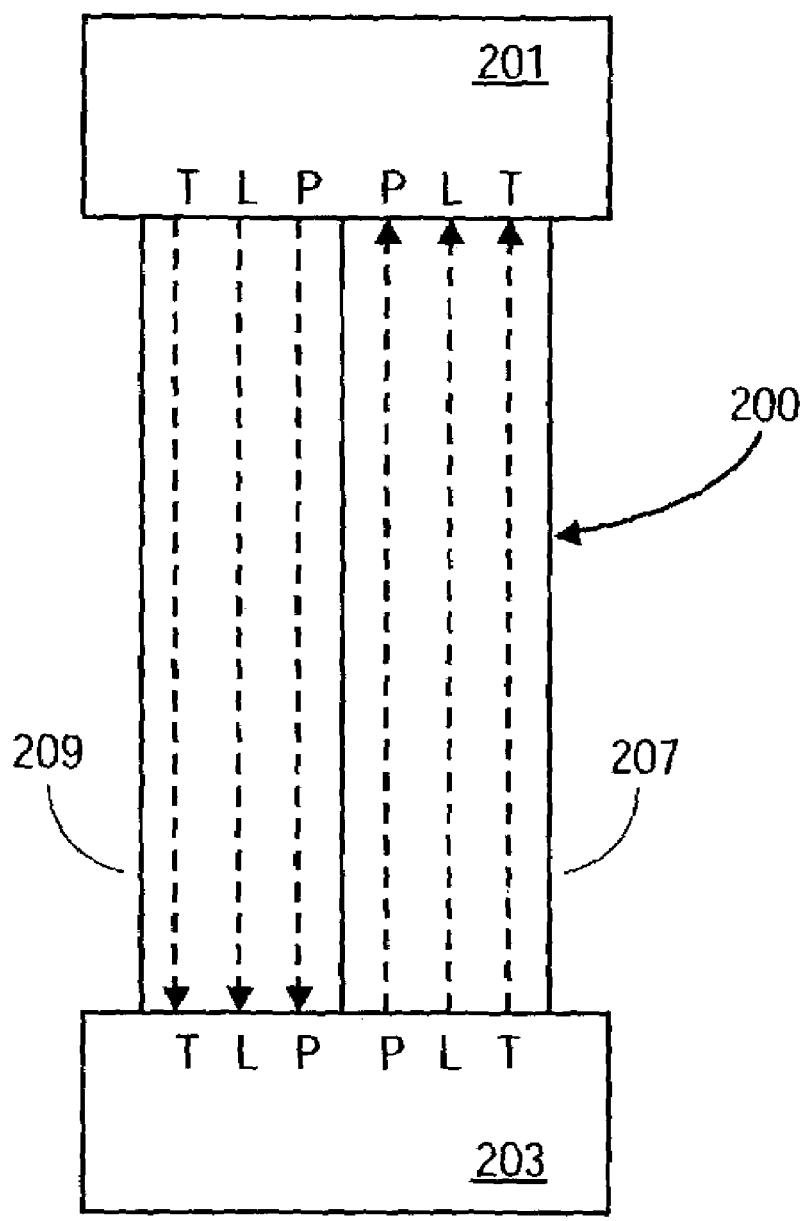
FIG. 2 is a diagram of an individual link.

FIG. 2 is a diagram of an exemplary link 200. In one embodiment, link 200 connects an 'upstream' device 201 with a 'downstream' device 203. An upstream device 201 is a network device that occupies a higher level in the tree topology of network 100 than network device 203 at the other end of connection 200. For Example, referring to FIG. 1 intermediate node 107 is an upstream device connected via link 159 to downstream endpoint device 113. An upstream device 201 in this topology can be an intermediate node or root complex. A downstream device 203 in this topology can be either an intermediate node or an endpoint.

In one embodiment, link 200 is composed of an upstream lane 207 and a downstream lane 209. Upstream lane 207 allows downstream device 203 to transmit data to upstream device 201. Likewise, downstream lane 209 allows upstream device 201 to transmit data to downstream device 203. Each of these lanes 207 and 209 can be characterized as being composed of a transaction layer (T), link layer (L) and physical layer (P). In one embodiment, the transaction layer manages the translation of read and write requests and data transmission into transaction layer packets (TLPs).

In one embodiment, the link layer is the physical characterization of a data link layer system. The data link layer system manages error recovery (e.g., initialization of the retransmission of transaction layer packets) and flow control. This is carried out by the transmission of data link layer packets (DLLPs).

In one embodiment, the physical layer is a set of differential transmit pairs and differential receive pairs. The interconnects of the physical layer transmit dual simplex data on point to point connections that are self clocked. Bandwidth can be adjusted in a linear fashion by increasing the interconnect width and frequency (e.g. adding multiple lanes and increasing the speed of transmission). In one embodiment, network devices include a state machine or similar apparatus for controlling the power levels of the transmit lanes attached to the device. If no power management scheme were implemented in the system, a link would consume the same amount of power regardless of whether it was transmitting data. Because there would be no lower powered state, if a device did not have any data to transmit it would send "idle characters" (e.g., a known set of bits that identifies when the transmission is to be ignored) across the link in order to maintain synchronization with the device at the other end of the link. Without a power management scheme idle characters would be transmitted over these interconnects requiring full power.

In one embodiment, when in normal operation a link 200 is in an active power state ('L0'). However, when a network device 203 does not have any data to transmit or is unable to transmit, it is not necessary for upstream lane 207 to remain in an active state. Instead, upstream lane 207 can be placed in a lower power state ('L0s') until it is needed to transmit again. In one embodiment, the L0s state is a type of standby state where power is reduced for upstream lane 207. However, upstream lane 207 is kept in a state such that the lane can return to the active power state L0 which is capable of transmission in a short time. Thus, L0s is a low power state having a low exit latency. In one embodiment, this low power state L0s is implemented in the device physical layer and any lane (upstream or downstream) can be placed in this state. L0s is optimized towards minimal transmission times by minimizing latency for both entry and exit from the low power state. In one embodiment, there is no handshake between the link edges before entering the low-power state. A link edge is a device that communicates at one end of the link.

In one embodiment, L0s exit latencies may differ significantly depending on whether a reference clock for opposing link edges of a given link is provided from the same source or delivered to each linkage device from a different source. The L0s exit latency depends mainly on the ability of the receiving device to quickly acquire bit and symbol synchronization. In one embodiment, a network device (endpoint, intermediate node or root complex) powers up with the L0s enabled by default if it shares a common reference clock source with the network device on the opposite end of the link (e.g., a common, distributed reference clock configuration). L0s is disabled by default if the network device at the opposite end of a given link has a different asynchronous component reference clock input. Entry into the L0s state is managed separately for each direction (or 'lane') of a link. In one embodiment, it is the responsibility of each device at either end of a link to initiate an entry into the L0s state on its transmitting lane. A port (i.e., an interface between a network device and link) that is disabled for the L0s state must not transition its transmitting lanes to the L0s state. It must still however be able to tolerate having its receiver port lanes entering L0s as a result of the device at the other end bringing its transmitting lanes into the L0s state and then later returning to the L0 state.

Figure 3:
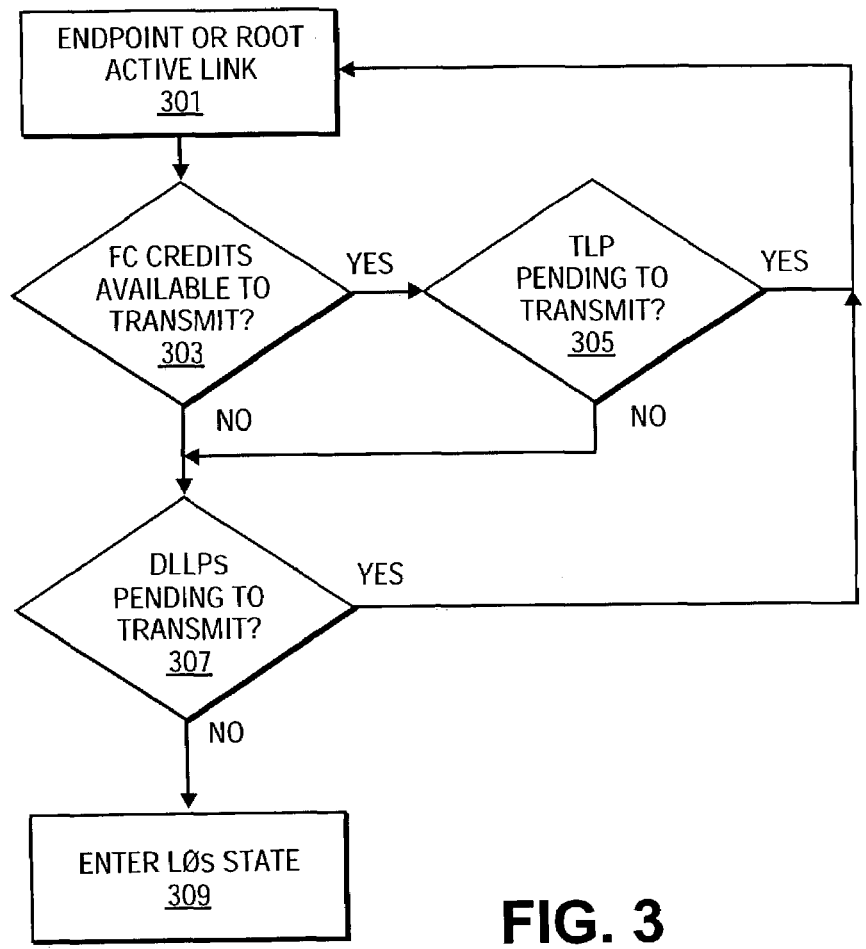
FIG. 3 is a flow-chart of a procedure for an endpoint to transition a connected lane into an L0s state.

FIG. 3 is a flow-chart depicting an exemplary procedure for transitioning a lane connected to either an endpoint 111 or a root complex 101 from an active state L0 to a low power state L0s. In one exemplary embodiment, upstream lane 207 begins in an active state (block 301). Endpoint device 111 (or 203) determines if any flow control credits are available to allow transmission of data to a recipient network device 107 (or 201) (block 303). Credits are flow control management devices that are exchanged between network devices that transmit data to one another. A network device limits the incoming data by limiting the number of credits given to other devices. In one embodiment, if endpoint device 111 does not have credits for an intended recipient (e.g., intermediate node 107) then it cannot transmit data to that recipient 107. If flow control credits are available, endpoint device 111 determines if any transactions are scheduled to be transmitted on upstream lane 207 (block 305). If there are scheduled transactions and credits available then endpoint device 111 must maintain upstream lane 207 in the L0 state.

In one embodiment, if there are not any transactions scheduled then endpoint device 111 determines if there are any DLLPs including acknowledgement messages being transmitted or pending transmission (block 307) on upstream lane 207. If there are active or pending transmissions of DLLPs then upstream lane 207 must be maintained in the L0 state. However, if there are no pending DLLPs then endpoint device 111 can transition upstream lane 207 to the L0s state.

In one embodiment, the identified conditions must be met for a predetermined period, for example two symbol times. Exemplary time periods may be the length of two symbol transmissions, exit latency of the link or well known heuristics for optimizing the time period that maximizes the time period in which the link is in a low power state while reducing the frequency of exits from the low power state. In one embodiment, the transition to the L0s state is executed by the physical layer. Protocol layers are not involved in the transition into or out of the L0s state. In regard to root complex 101, these rules apply in terms of downstream lanes 209 of root complex 101 that are in links (e.g, link 151 and link 149) to each network device on the next lower level of the tree (e.g., devices 103 and 105).

Figure 4:
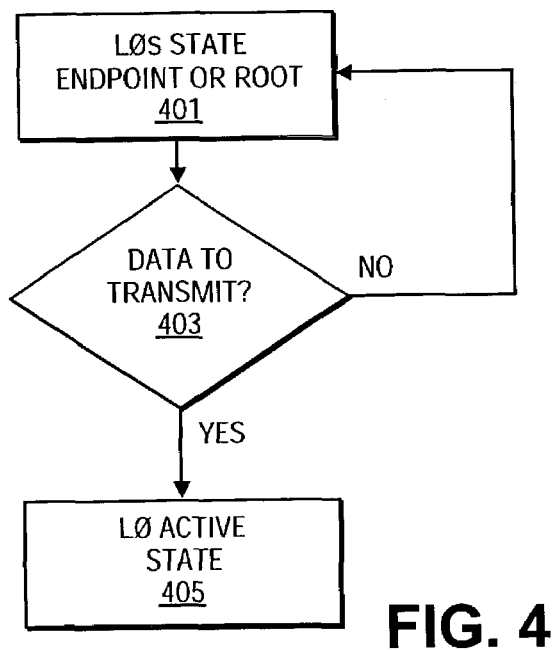
FIG. 4 is a flow-chart of a procedure for an endpoint to transition a connected lane out of the L0s state.

FIG. 4 is a flow-chart of an exemplary procedure for exiting the L0s state to return to a L0 state for an endpoint 111 or root complex 101. An endpoint 111 or root complex 101 can initiate an exit from the L0s state on its upstream transmit lanes and downstream transmit lanes, respectively.

In one embodiment, endpoint device 111 starts in the L0s state (block 401). Endpoint device 111 checks periodically if it has data to transmit over lane 207 (block 403). As long as there is no data to transmit endpoint device 111 maintains lane 207 in the L0s state. If it is detected that it is necessary to transmit data on lane 207, then endpoint device 111 transitions upstream lane 207 to the active L0 state (block 405). This procedure is direction independent, an endpoint uses this procedure for upstream lanes and a root complex uses this procedure for downstream lanes.

In one embodiment, the transition from the L0s state to the L0 state is not dependent on the status or availability of flow control credits. In this embodiment, the link is able to reach the L0 state and exchange flow control credits across the link. For example, if all credits of a particular type were consumed when the link entered L0s, then any component on either side of the link must still be able to transition the link to the L0 state so that new credits can be sent across the link.

Figure 5:
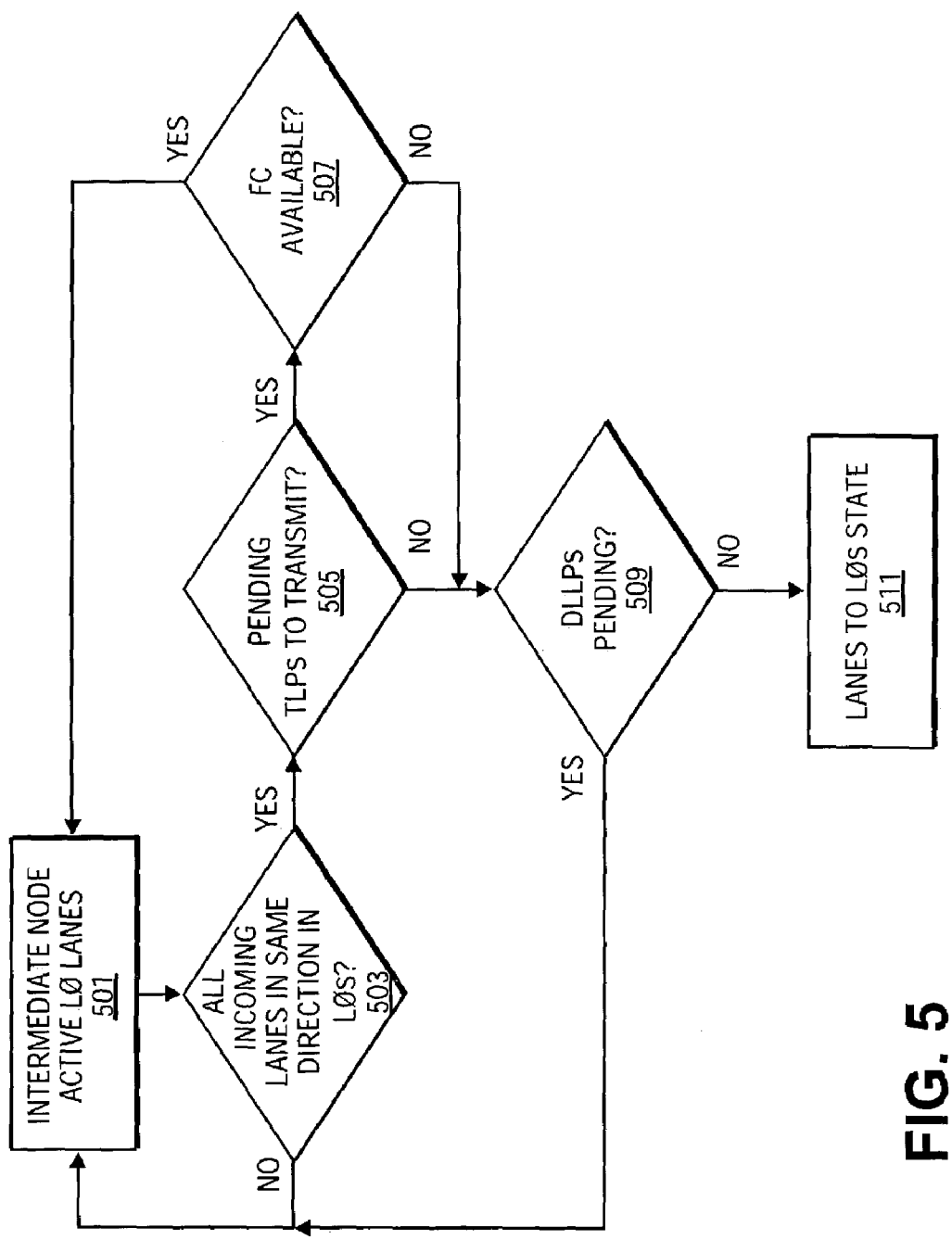
FIG. 5 is a flow-chart of a procedure for an intermediate node to transition a connected lane into an L0s state.

FIG. 5 is a flow-chart of an exemplary procedure for an intermediate node, such as a switch or similar device, to transition a lane to the L0s state. In one embodiment, an intermediate node 107 in the L0 state (block 501) periodically checks if all receiving lanes in either direction, are in the L0s state (block 503). If lanes in both directions are in the active L0 state then intermediate node 107 maintains all of its lanes in their current state. In one embodiment, if intermediate node 107 detects that all the receiving lanes in a direction are in the L0s state, then intermediate node 107 determines if there are any transactions scheduled (block 505) and if any appropriate flow control credits are available (block 507). Finally, if there are not any transactions pending or there are not any credits available intermediate node 107 determines if there are any DLLPs scheduled or pending transmission (block 505). If there are no scheduled or pending transmissions in the given direction then intermediate node 107 can transition the lane in the given direction into the L0s state (block 511). For example, if all downstream receiving lanes are in L0s then the upstream transmit lane can be transitioned to L0s. In one embodiment, the identified conditions must be met for a predetermined period, for example two symbol times. In another embodiment, a well-known heuristic is used in connection with the above-identified criteria to determine the time of entry into the L0s state.

Figure 6:
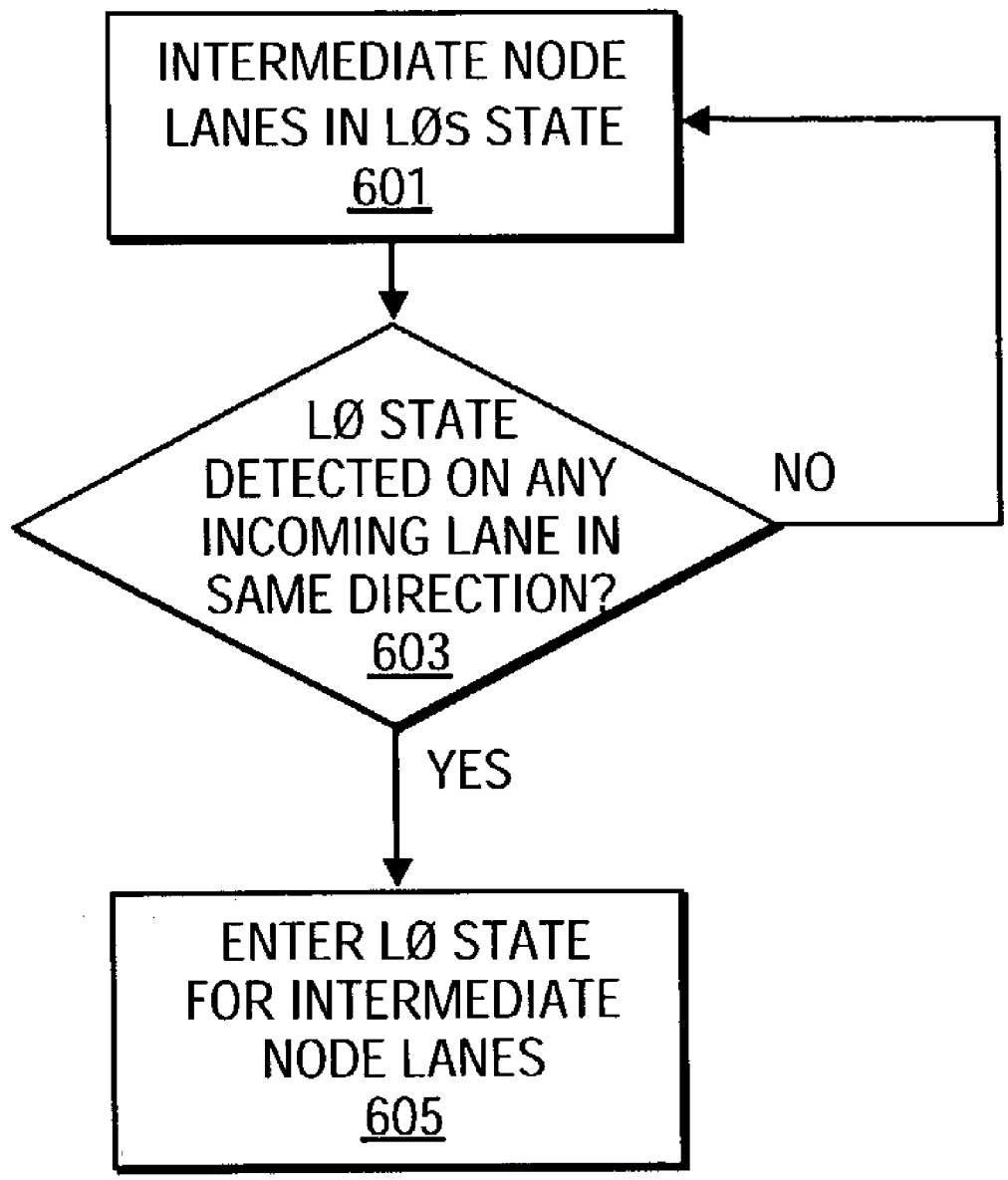
FIG. 6 is a flow-chart of a procedure for an intermediate node to transition a connected lane out of an L0s state.

FIG. 6 is a flow-chart of an exemplary procedure for an intermediate node 107 to transition a transmitting lane from the L0s state (block 601) to the active L0 state. In one embodiment, intermediate node 107 continuously checks receiving lanes to determine if they are in the L0 state (block 603). If a change to the L0 state is not detected then intermediate node 107 maintains transmitting lanes in their current state. If a change of receiving lane to the L0 state is detected then the device transitions outgoing lanes in the same direction (e.g., if receiving upstream lane is in the L0 state then all downstream transmitting lanes are transitioned) (block 605). Transitioning all transmitting lanes in a direction opposite an active receiving lane reduces the accumulation of latency time for exiting to the L0 state for a packet traversing multiple nodes. For example, from an endpoint node 111 to the root complex 101. In another embodiment, speed in transmitting data across multiple nodes is traded for power conservation by only transitioning links in the direct path of a packet by examining the packet at each network device to determine the next stop in its path.

In one embodiment, and L1 state is a low power state that is executed between the protocol layers at the two ends of a link. The protocol layers bring the link into a low power state in an orderly manner, starting by completing any pending transactions between the link edges. Once this is completed, the physical layer is instructed to enter the low power state. This low power state, L1, is optimized for lower power consumption than L0s at the expense of longer entry and exit latencies. In one embodiment, L1 reduces link power beyond the L0s state for cases where very low power is required and longer transition times are acceptable. In one embodiment, support for the L1 state is optional among network devices (e.g., endpoint and intermediate devices). In one embodiment, the handshake mechanisms involves a set of in-band messages. Entry into a low power state L1 is initiated by network devices originating traffic through network 100 (e.g. endpoints).

In one embodiment, three messages are defined to support the L1 state. An active state request message that is a DLLP, a request acknowledgement message, which is a DLLP, and an active state negative acknowledgement message which is a TLP. Endpoints that are enabled for L1 negotiate to enter the L1 state with the network device on the upstream end of the link.

Figure 7A:
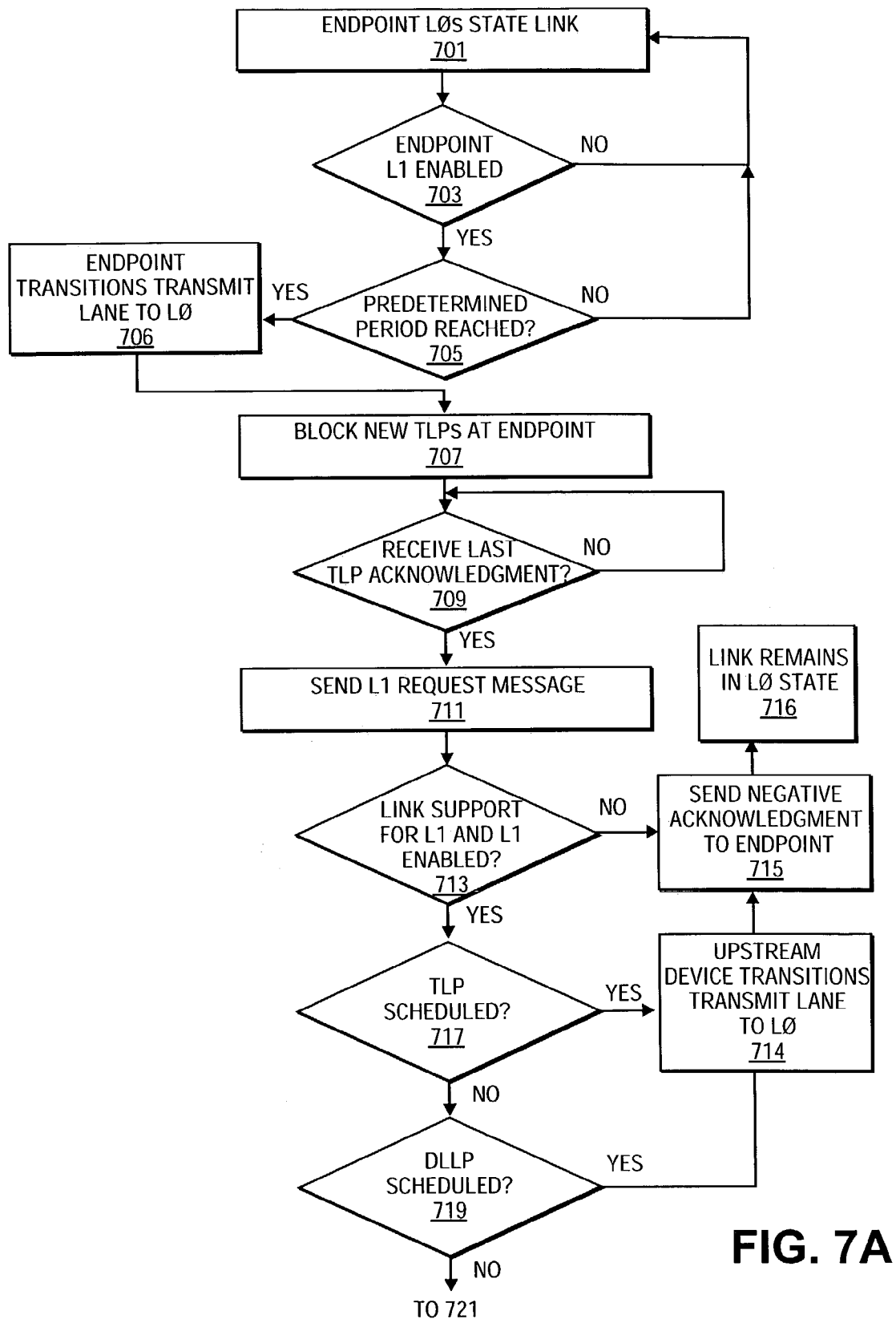
FIG. 7A is a first part of a flow-chart of a procedure for an endpoint to transition a connected link into an L1 state.
Figure 7B:
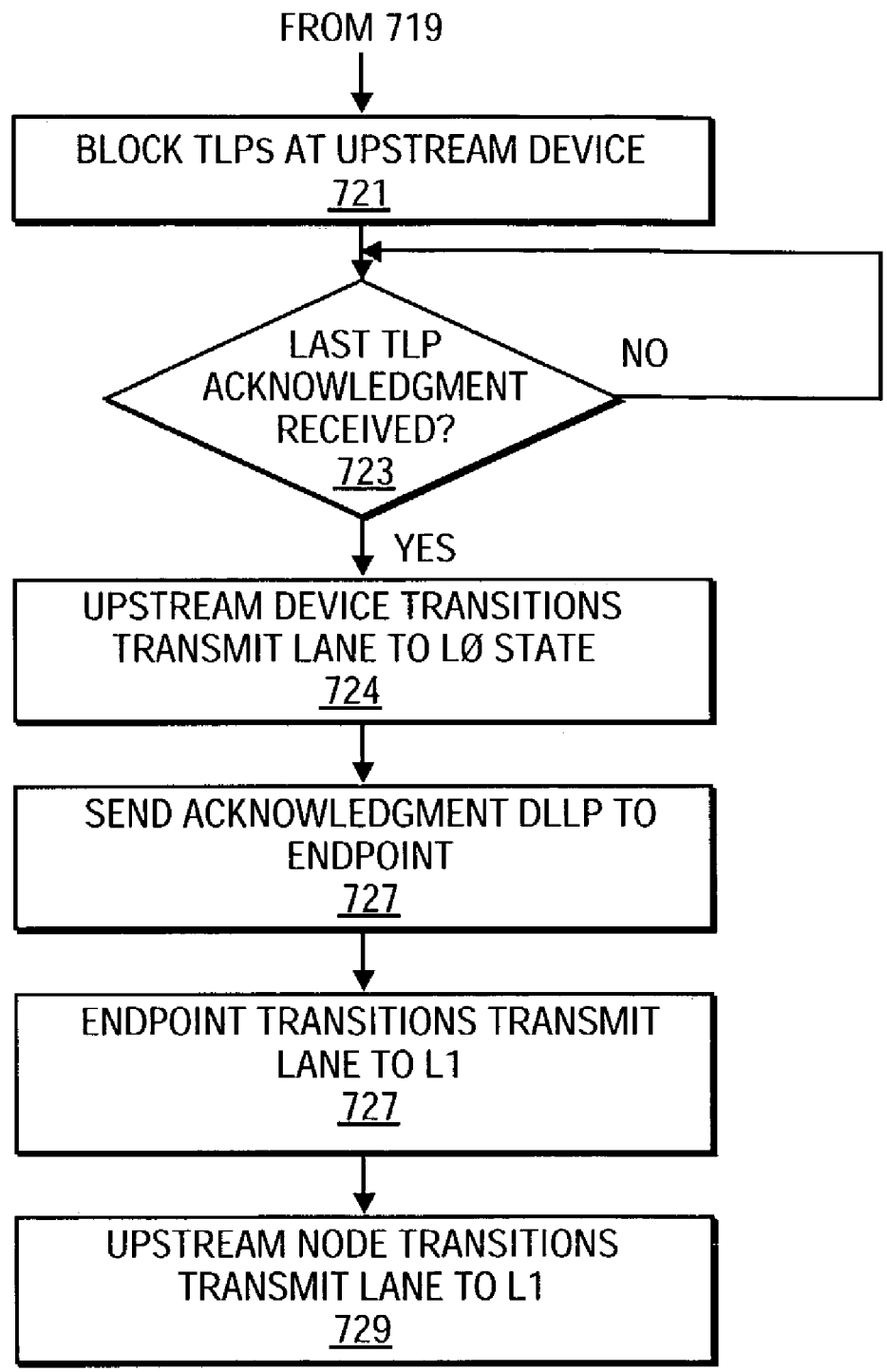
FIG. 7B is a second part of a flow-chart of a procedure for an endpoint to transition a connected link into an L1 state.

FIGS. 7A and 7B illustrate a flow-chart of an exemplary procedure for an endpoint 111 to transition a link 157 to an L1 state. In one embodiment, this procedure applies to an endpoint 111 in the L0s state (block 701). Only endpoints that are enabled for the L1 state carry out this procedure, if endpoint 111 is not enabled it will remain in the L0s state (block 703). In one embodiment, endpoint 111 determines if link 157 has been in a L0s state for a predetermined period of time (block 705). If endpoint 111 has not been in this state for the predetermined period then it will remain in the L0s state. In another embodiment, well known heuristic devices are also used to determine when to initiate a transition to the L1 state from the L0s state or L0 state. In one embodiment, endpoint 111 then transitions its transmit lane 207 to the L0 state in order to send messages across link 157 (block 706). If endpoint 111 has met the predetermined criteria then it blocks the scheduling of new transactions (block 707). Endpoint 111 waits to receive acknowledgements for all transaction data transmitted (709). Once the transmitted data has been acknowledged endpoint 111 sends a request message to upstream device 107 (block 711). In one embodiment, endpoint 111 sends the request message continually until it receives a response from upstream device 107. Endpoint 111 remains in this loop waiting for a response from the upstream device 107. During this waiting period, the endpoint device 111 must not initiate any transaction layer transfers. However, in one embodiment, endpoint device 111 accepts TLPs and DLLPs from upstream device 107. It also responds with DLLPs as needed by the link layer protocols. In one embodiment, if endpoint device 111 needs to initiate a transfer on the link for any reason it must first complete the transition to the low power link state. Once in a lower power link L1 state the endpoint device is then permitted to exit the low power link L1 state to handle the transfer. This embodiment involves less complexity and therefor reduces the cost and space required. In another embodiment, endpoint device 111 exits the handshake process in order to transmit the TLP in a more timely fashion.

In one embodiment, upstream device 107 determines if it is L1 enabled in relation to link 157 from which the request was received (block 713). If the upstream device 107 is not L1 enabled then it will transition its transmit lane 209 to the L0 state (block 714) and send a negative acknowledgement message to endpoint 111 (block 715). Link 157 will then remain in the L0 state (block 716). If upstream device 107 does support the L1 state, upstream device 107 determines if it has any transactions scheduled to be transmitted over link 157 to endpoint device 111 which sent the request (block 717). If there are transactions scheduled then upstream device 107 will transition its transmit lane 209 to the L0 state (block 714) and will send a negative acknowledgement (block 715). Subsequently, link 157 remains in the L0 state (block 716).

In one embodiment, upstream device 107 must wait until a minimum number of flow control credits required to send the largest possible packet of a flow control type are accumulated. This allows the network device to immediately issue a TLP after it exits from the L1 state.

In one embodiment, if no transactions are scheduled, upstream device 107 determines if DLLPs are pending transmission or scheduled for transmission (block 719). If DLLPs are pending or scheduled then transmit lane 209 is transitioned to the L0 state (block 714) and a negative acknowledgement is sent to endpoint device 111 (block 715). Subsequently, link 157 remains in the L0 state (block 716). If no DLLPs are pending or scheduled then upstream device 107 blocks the scheduling of transactions (block 721). In one embodiment, upstream device 107 waits for the acknowledgement of the last transaction sent (block 723) before transitioning to the L0 state (block 724) and sending a positive acknowledgement to endpoint device 111 of the L1 request using a DLLP (block 725).

Endpoint 111 and upstream device 107 then transition each lane of the link to the L1 state (block 727 and 729).

When endpoint device 111 detects the positive acknowledgement DLLP on its receive lanes 209 it ceases sending the request DLLP and disables its link layer and brings its transmit lanes 207 into the electrical idle state L1. Upstream device 107 continuously sends the positive acknowledgement DLLP until it detects that its receive lanes 207 have entered into the L1 electrical idle state. When upstream device 107 detects an L1 electrical idle on its receive lanes 207 it ceases to send the positive acknowledgment DLLP, disables its link layer and brings the downstream lanes 209 into the L1 electrical idle state. In one embodiment, if upstream device 107 for any reason needs to initiate a transfer on link 157 after it sends the positive acknowledgement DLLP, it must first complete the transition to the low power state L1. It can then exit the low power L1 state to handle the transfer once link 157 returns to the L0 state.

In one embodiment, a transaction layer completion timeout mechanism is used in conjunction with network 100 to determine when a TLP needs to be resent or is not received. This mechanism is not affected by the transition to the L1 state, thus it continues to count. Likewise, in one embodiment, flow control update timers are used in connection with network 100. These timers are frozen while a link is in the L1 state to prevent a timer expiration that will unnecessarily transition the link back to the L0 state.

Figure 8A:
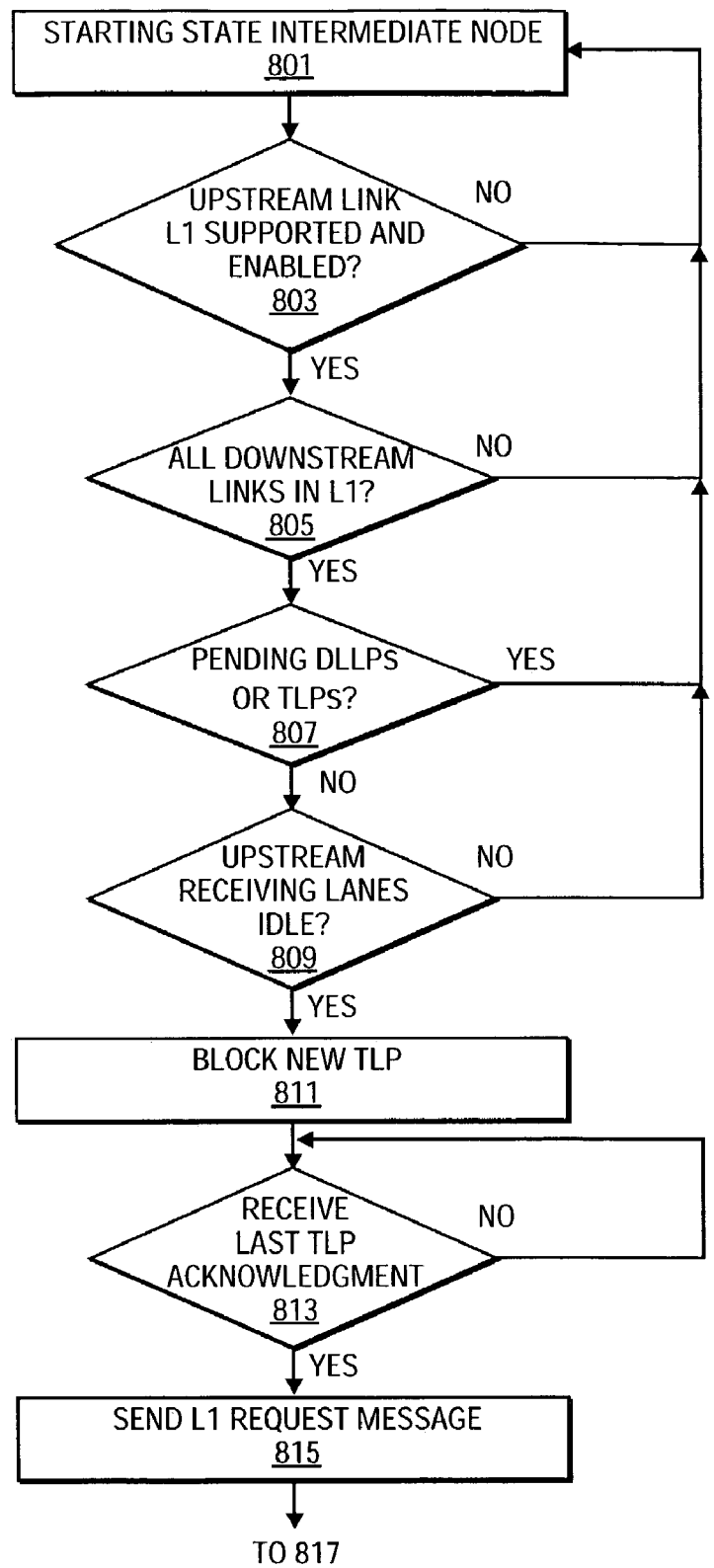
FIG. 8A is a first part of a flow-chart of a procedure for an intermediate node to transition a connected link into an L1 state.
Figure 8B:
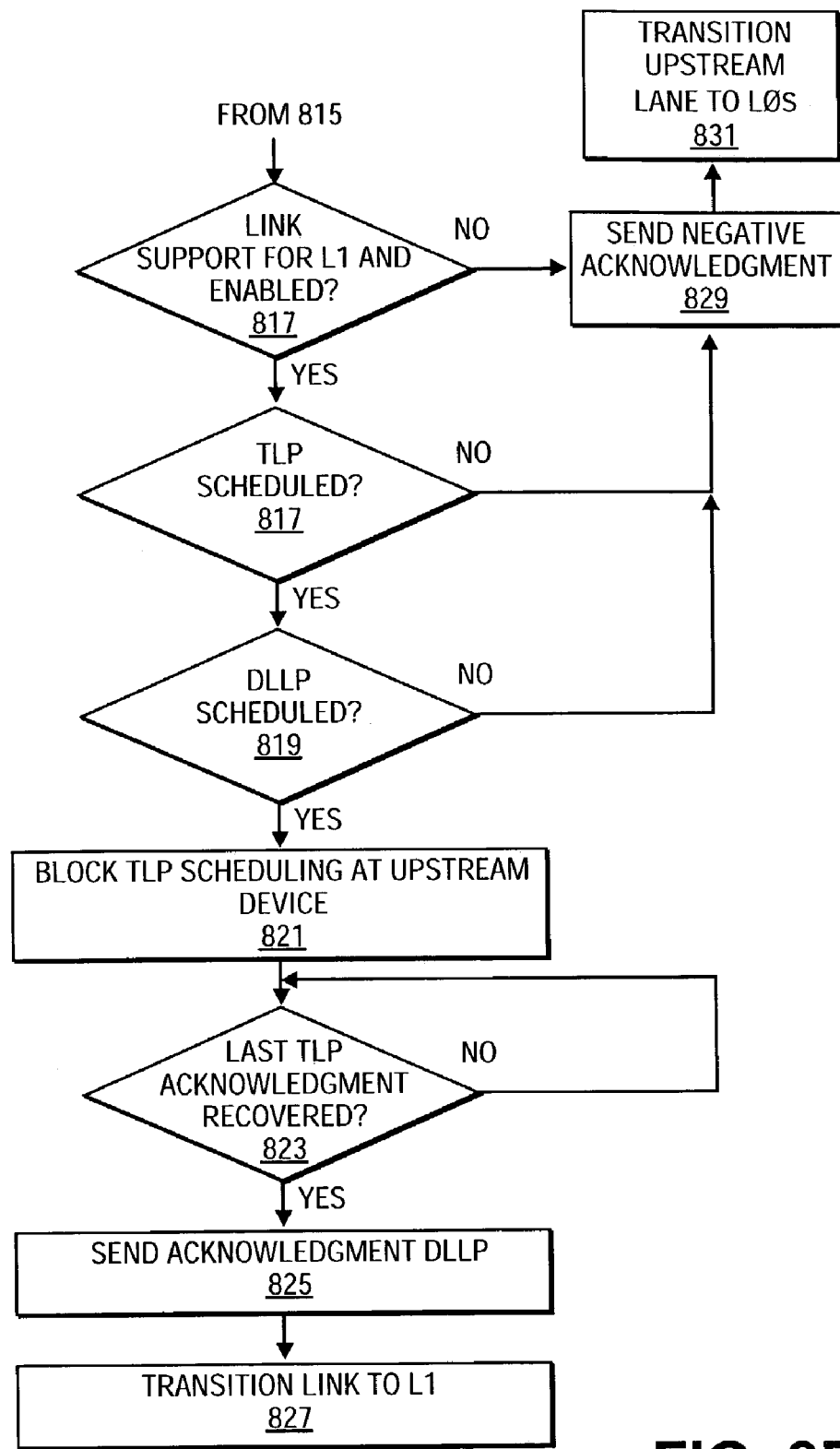
FIG. 8B is a second part of a flow-chart of a procedure for an intermediate node to transition a connected link into and L1 state.

FIGS. 8A and 8B illustrate a flow-chart of an exemplary procedure for an intermediate node 107 such as a switch or similar device to transition an upstream link 153 into the L1 state. Intermediate node 107 may have an upstream link in a L0s state or L0 state (block 801). Intermediate node 107 determines if upstream link 153 supports L1 and if L1 support is enabled (block 803). Intermediate node 107 also determines if all downstream links 157 and 159 are in an L1 state (block 805) and if any transactions or DLLPs have been scheduled (blocks 805 and 807). If there are no scheduled transmissions and the receiving lanes are idle (block 809) then intermediate node 107 blocks the scheduling of TLPs (block 811). Intermediate node 107 then verifies that the last TLP sent has been acknowledged (block 813). In one embodiment, intermediate node 107 must wait until a minimum number of flow control credits required to send the largest possible packet of a flow control type are accumulated. This allows the network device to immediately issue a TLP after it exits from the L1 state. In one embodiment, intermediate node 107 and upstream device 105 transition their transmit links to the L0 state before transmitting messages over link 153. Intermediate node 107 then sends a request message to upstream device 105 (block 815). In one embodiment, intermediate node 107 sends the request message continually until it receives a response from upstream device 105. Intermediate node 107 remains in this loop waiting for a response from upstream device 105. Upstream device 105 determines if it supports the L1 state for the port the message is received from and if the L1 state is enabled for the link 153 (block 817). If the L1 state is not supported or enabled then upstream device 105 sends a negative acknowledgment to intermediate node 107 (block 829). Upon receipt of a negative acknowledgement intermediate node 107 transitions its upstream lane to the L0s state (block 831).

In one embodiment, the upstream device 105 if enabled for the L1 state determines if it has a transaction scheduled or pending (block 817) for link 153 or if it has a DLLP scheduled or pending (block 819) for link 153. If either of those conditions are true then a negative acknowledgement is sent (block 829) to intermediate node 107. If there are no scheduled transmissions, then upstream device 105 blocks the scheduling of transactions for that link (block 821) and waits for the receipt of the last transaction's acknowledgment, if necessary (block 823). Upon verifying the last transaction is complete the upstream device 105 sends a positive acknowledgment as a DLLP to intermediate node 107 (block 825). Intermediate node 107 and upstream device 105 then transition the link to the L1 state (block 827) in the same manner as an endpoint and intermediate node.

Figure 9:
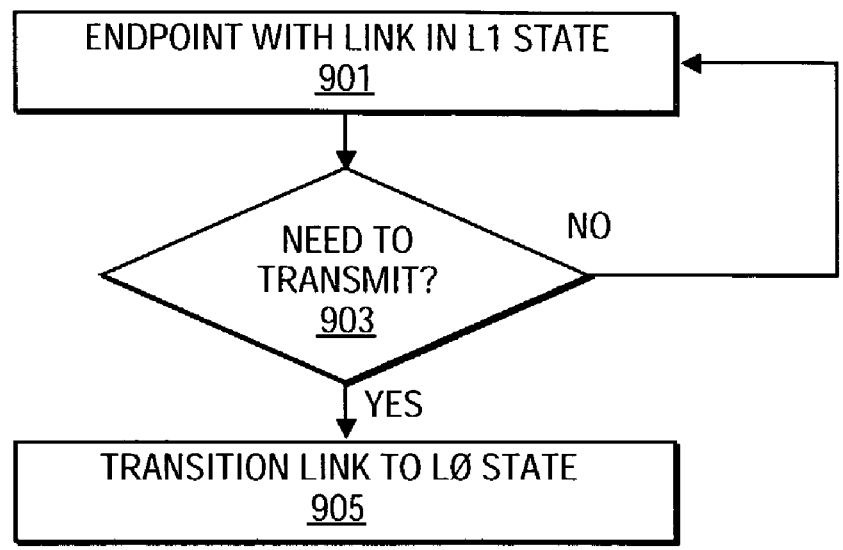
FIG. 9 is a flow-chart of a procedure for an endpoint to transition a connected link out of an L1 state.

FIG. 9 is a flow-chart of an exemplary procedure for an endpoint 111 to transition an upstream link 157 from the L1 state to the L0 state. Unlike the entry protocol the exit protocol does not involve negotiation between the edges of a link. In one embodiment, an endpoint device 111 may have data to transmit while in the L1 state (block 901). Endpoint 111 will periodically check for data to be transmitted or otherwise be notified of the need to transmit data (block 903). Upon detecting the need to transmit data, endpoint 111 transitions the transmit lane of link 157 to the L0 state (block 905).

Figure 10:
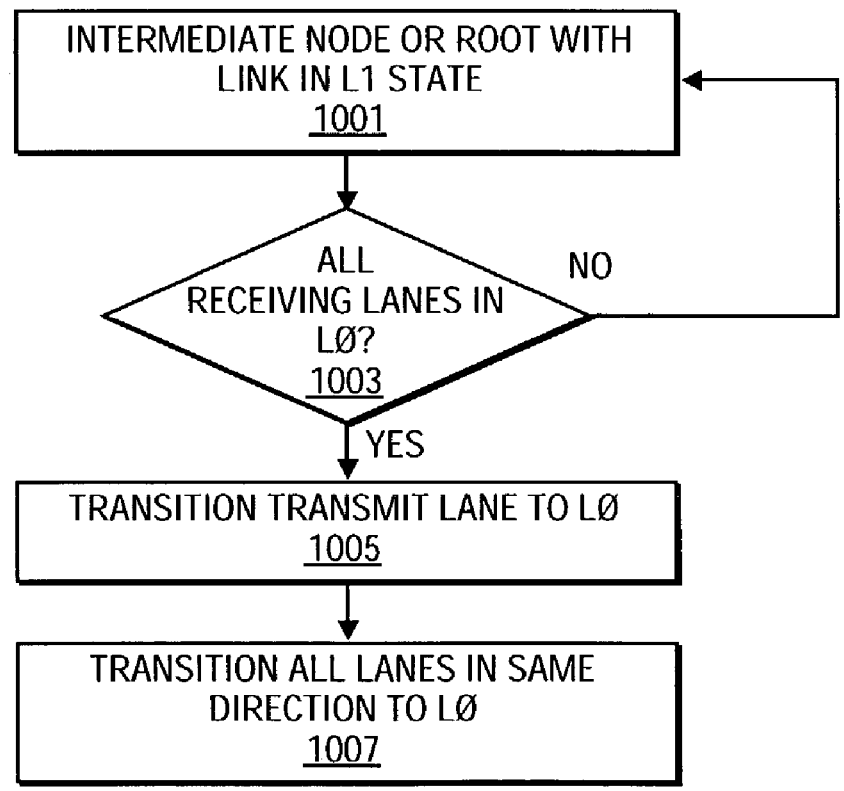
FIG. 10 is a flow-chart of a procedure for an intermediate node to transition a connected link out of an L1 state.

FIG. 10 is a flow-chart of an exemplary procedure for an intermediate node or root complex to transition a downstream lane to the L0 state from the L1 state. In one embodiment, upstream device 107 having a downstream link 157 in and L1 state (block 1001) periodically checks the receiving lane of link 157 to determine if it has entered the L0 state (block 1003). Intermediate node 107 checks each of its receiving lanes to determine if one transitions to the L0 state. If a lane is detected in the L0 state the transmit lane of the same link will be transitioned to the L0 state (block 1005). Also, any transmit link that is in the same direction (i.e., downstream or upstream) as the link that is detected in the L0 state is transitioned to the L0 state (block 1007). Thus, if the receiving lane of link 157 is detected in the L0 state then intermediate node 107 will transition the transmit lane of link 153, which is in the same direction (upstream) as the receiving lane that transitioned. Likewise, if receiving lane of link 153 is detected in the L0 state then intermediate node 107 will transition the outgoing (downstream) lanes of links 157 and 159 to the L0 state. In one embodiment, because L1 exit latencies are relatively long, an intermediate node 107 does not wait until its downstream port link has fully exited to the L0 state before initiating and L1 exit transition on its upstream port link. Waiting until the downstream link has completed the L0 transition will cause a message traveling through several intermediate nodes to experience an accumulated latency as it traversed each switch. In one embodiment, an intermediate node 107 initiates an L1 exit transition on its upstream port link after no more than one microsecond from the beginning of an L1 exit transition on any of its downstream port links. In one embodiment, intermediate node 107 does not transition from the L1 state to the L0 state on links that are not in the direction of the message to be transmitted.

In one embodiment, links that are already in the L0 state do not participate in the exit transition. In one embodiment, downstream links whose downstream network device is in a low power state are also not affect by exit transitions. For example, if an intermediate node with an upstream port in L0s and a downstream network device in a low power state receives a packet destined for the downstream network device in the low power mode the downstream link connecting the intermediate node to the downstream network device will not transition to the L0 state yet. Rather, it will remain in the L1 state. The packet destined for the downstream network device will be checked and routed to the downstream port that shares a link with the downstream device in the low power state. The intermediate node then transitions the downstream link to the L0 state. The transition to the L0 state is thus triggered by the packet being routed to that particular downstream link not by the transition of an upstream link into the L0 state. If a packet is destined for another node then the link to the low power network device would have remained in the L1 state.

Figure 11:
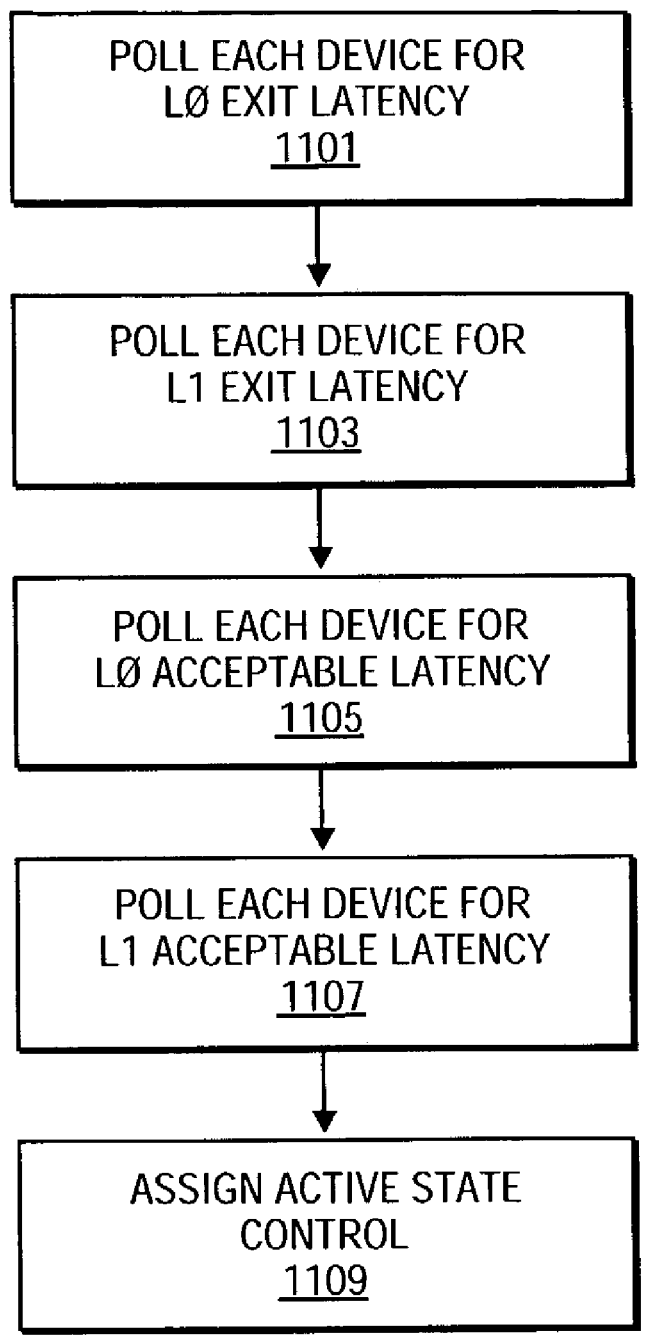
FIG. 11 is a flow-chart of a procedure for determining the enablement of the L0s and L1 states for a network device by power management software.

FIG. 11 is a flow chart illustrating the operation of a program that manages the architecture support for the L0s and L1 states in network 100. This program ensures that no link in network hierarchy 100 enters a lower power state than allowed by a device using it. The program polls each device in network 100 to retrieve its L0s exit latency time (block 1101). In one embodiment, component reference clock information is available that can serve as a determining factor in the L0s exit latency value reported by a network device. In one embodiment, reference clock configuration information can also be accessed directly to determine the initial enablement or disablement values for a network device. The program also polls each network device for its L1 exit latency timing (block 1103), its L0s latency tolerance (block 1105) and L1 latency tolerance (block 1107). In one embodiment, isochronous traffic requires bounded service latencies. The distributed power management system may add latency to isochronous transactions beyond expected limits. In one embodiment, the power management system is disabled for network devices that are configured with an isochronous virtual channel. Based on the information retrieved from each network device the program then assigns an active state control value to each device by setting an active link power management support field (block 1109). In one embodiment, the active state control value that is assigned to each device is based on the device's tolerance in comparison to the accumulative latency of the path between the device and another device such as an endpoint or root. In this embodiment, the device is enabled for the L0s or L1 state if the accumulated latency along the path is lower than the acceptable latency for the device. In one embodiment, this value labels each network device as supporting both the L0s and L1 state, either state separately or neither state. Thus, the power management software enables or disables each port of a component by setting a support field associated with that network device. The power management software can be implemented with a basic input output system (BIOS) for use with legacy operating systems or as a program that runs under or as part of an operating system.

Table I is an exemplary embodiment of an encoding scheme for an active link power management support field. In one embodiment, this field is stored in a storage device (e.g., a register, eeprom, or similar device) associated with an endpoint device or intermediate node device by the power management program.

TABLE I

| Field | Read/Write | Default Value | Description |
|---|---|---|---|
| Active State Link PM Support | RO | 01b or 11b | 00b-Reserved 01b-L0s supported 10b-Reserved 11b-L0s and L1 supported |

Table II is an exemplary encoding of L0 exit latencies for endpoint devices and intermediate nodes devices to be reported or monitored by the power management program.

TABLE II

| Field | Read/Write | Default Value | Description |
|---|---|---|---|
| L0s Exit Latency | RO | N/A | 000b-less than 64 ns 001b-64 ns–128 ns 010b-128 ns–256 ns 011b-256 ns–512 ns 100b-512 ns–1 µs 101b-1 µs–2 µs 110b-2 µs–4 µs 111b-Reserved |

Table III is an exemplary encoding of L1 exit latencies for endpoint devices and intermediate node devices to be reported or monitored by the power management program.

TABLE IV

| Field | Read/Write | Default Value | Description |
|---|---|---|---|
| L1 Exit Latency | RO | N/A | 000b-less than 1 µs 001b-1 µs–2 µs 010b-2 µs–4 µs 011b-4 µs–8 µs 100b-8 µs–16 µs 101b-16 µs–32 µs 110b-32 µs–64 µs 111b-L1 transition not supported |

Tables IV and V are an exemplary encoding of endpoint latency tolerances. Endpoints devices report or store a value indicating latency the endpoint devices can absorb due to transition times from the L0s and L1 states to the L0 state for an associated link: Power management software, using the latency information reported by all components in the hierarchy can enable the appropriate level of active link power management support by comparing exit latencies for each given path from the root to endpoint against the acceptable latency that each corresponding endpoint can withstand.

TABLE IV

| Field | Read/write | Default Value | Description |
|---|---|---|---|
| Endpoint L0s Acceptable Latency | RO | N/A | 000b-less than 64 ns 001b-64 ns–128 ns 010b-128 ns–256 ns 011b-256 ns–512 µs 100b-512 ns–1 µs 101b-1 µs–2 µs 110b-2 µs–4 µs 111b-More than 4 µs |

TABLE V

| Field | Read/Write | Default Value | Description |
|---|---|---|---|
| Endpoint L1 Acceptable Latency | RO | N/A | 000b-less than 1 µs 001b-1 µs–2 µs 010b-2 µs–4 µs 011b-4 µs–8 µs 100b-8 µs–16 µs 101b-16 µs–32 µs 110b-32 µs–64 µs 111b-More than 4 µs |

In one embodiment, multi-function endpoints are programmed with different values in their respective support fields for each function. In one embodiment, a policy is used that multi-function devices will be governed by the most active common denominator among all of its active state functions based on:

whether functions in non-active states are ignored in determining the active state link power management policy;

whether any active state functions have their active state link power management disabled resulting in the entire network device being disabled;

if at least one of the active state functions is enabled for L0s only then the active state link power management is enabled for the L0s state only, for the entire component;

if the other rules do not apply then the active state link power management is enabled for both L0s and L1.

In one embodiment, network devices are able to change their behavior during runtime as devices enter and exit low power device states. For example, if one function within a multi-function component is programmed to disable active state link power management, then active state link power management will be disabled for that network device while that function is in the active state. If the network device transitions to a non-active state then the active state power management will be enabled to at least support the L0s state if all other functions are enabled for active state link power management.

In one embodiment, network devices, including endpoint and intermediate devices also have low power states. Network devices in an active state can conserve power using the power management scheme for their associated links. Even if the network devices are in an active state, power savings can be achieved by placing idle links in the L0s and L1 states. This allows the hardware network devices autonomous dynamic link power reduction beyond what is achievable by software only control of power management.

Figure 12:
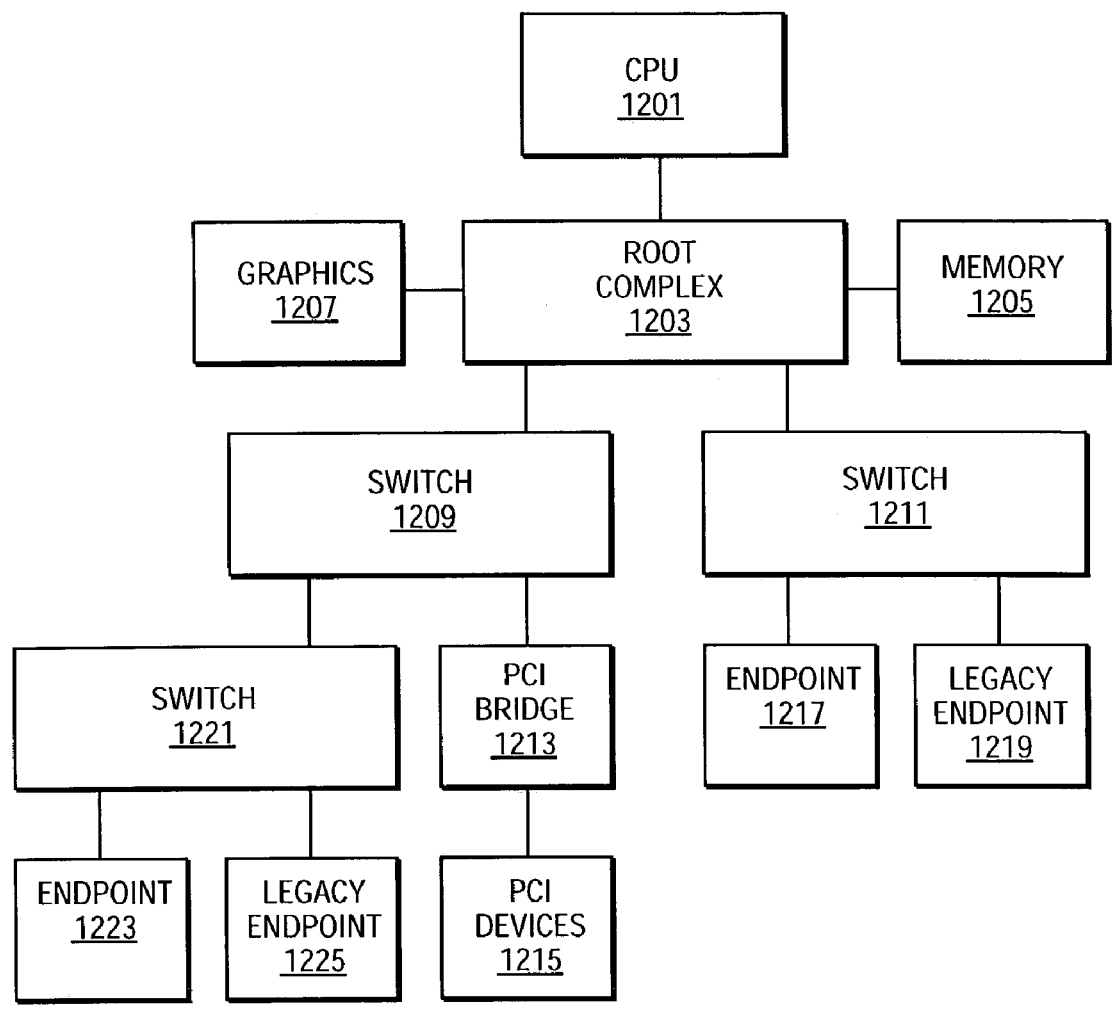
FIG. 12 is a block diagram of computer system with a communication link network.

FIG. 12 is a block diagram of a computer system encompassing the power management scheme. In one embodiment, the system includes a central processing unit 1201, graphics port 1207 and memory device 1205 connected to the root complex 1203. The root complex is connected to switches 1209 and 1211. Switch 1209 is further coupled to switch 1221 and PCI bridge 1213. PCI bridge 1213 allows communication between the network and a set of PCI devices 1215. Switches 1221 and 1211 allow endpoint devices 1223 and 1217 and legacy endpoint devices 1225 and 1219, respectively, to communicate with other devices on the network. In one embodiment, endpoints can be peripheral cards such as audio cards modems, or similar devices. Endpoints can also include docks and cables connecting consumer devices or systems to the network 100.

In another embodiment, the network can be adapted for use in a network routing device or other specialized system. In this system, power management is optimized to support peer to peer data transmission. A network router may have multiple communication devices at endpoints in a tree hierarchy that need to forward packets to one another. This system would also include a specialized processor (e.g., an application specific integrated circuit) for facilitating the forwarding of network traffic and for implementing security protocols.

In one embodiment, the power management scheme is used in connection with the PCI Express® standard. All PCI Express® compatible components support an L0s power state for devices in an active state. All PCI Express® devices must report their level of support for link power management and include an active state link power management support configuration field. PCI Express® components also report L0s and L1 exit latencies. Endpoints in the PCI Express® system must also report worst-case latency that they can withstand before risking data corruption, buffer overruns or similar problems.

In one embodiment, the power management system is a distributed system that uses in-band messaging in order to manage power usage. The distributed system dynamically analyzes the activity on the link to determine the transition policy. The system considers hierarchy performance and power tradeoffs when enabling low power states. Depending on in-band messaging reduces the complexity of the architecture and consequently reduces the space requirements for the system because specialized command and control lines are not needed. At least two states are defined in this system to allow the system a choice in trade offs between power reduction and performance. The L0s state allows some power savings while minimizing performance loss. The L1 state allows greater power savings at greater potential loss of performance. The power management system can be used in connection with any serial interconnect system, especially high speed serial interconnect systems. Exemplary devices that the power management system can be used with include I/O chipsets, graphics accelerators, interconnect devices and similar devices.

Another embodiment would implement the distributed power management system in software (e.g., microcode or higher level computer languages) in each device on the network. A software implementation may be stored on a machine readable medium. A "machine readable" medium may include any medium that can store or transfer information. Examples of a machine readable medium include a ROM, a floppy diskette, a CD-ROM, an optical disk, a hard disk, a radio frequency (RF) link, etc.

In the foregoing specification, the invention has been described with reference to specific embodiments thereof. It will, however, be evident that various modifications and changes can be made thereto without departing from the broader spirit and scope of the invention as set forth in the appended claims. One of ordinary skill in the art, for example, would understand that the power states described could be replaced with any number or type of power states (e.g., different levels of active power states for high speed and low speed transmissions) while remaining within the scope of the invention. The specification and drawings are, accordingly, to be regarded in an illustrative rather than a restrictive sense.

What is claimed is:

1. A method comprising:
    detecting a condition in a first device, the first device coupled to a first communication channel in an first power state, the first communication channel having a first portion and a second portion; and
    altering the power state of the first portion of the first communication channel to a second power state, wherein the condition is a first portion of the first communication channel that is idle for two symbol periods.

2. The method according to claim 1, wherein the second power state is a low power state with a low exit latency.

3. The method according to claim 1, further comprising:
    detecting the second power state of the first portion of the first communication channel by a second device; and
    altering the power state of a first portion of a second communication channel to the second power state.

4. The method according to claim 1, further comprising:
    detecting the second power state of a first portion of each of a plurality of communication channels by a second device.

5. The method according to claim 4, further comprising:
altering the power state of a first portion of a second communication channel to a low power state.

6. The method of claim 1, wherein the second power state is an active power state.

7. The method of claim 6, further comprising:
detecting the second power state of the first portion of the first communication channel by a second device; and
altering the power state of a first portion of a second communication channel to the second power state.

8. A method comprising:
detecting a first condition in a first device coupled to a first communication channel;
sending a first message to a second device coupled to the first communication channel;
detecting a second condition in the second device;
sending a second message from the second device to the first device;
altering a power state of a first portion and a second portion of the first communication channel to a first power state;
detecting a third condition in the second device, the second device coupled to a second communication channel; and
sending a third message to a third device coupled to the second communication channel.

9. The method of claim 8, further comprising:
disabling a first protocol layer;
disabling a second protocol layer, the second protocol layer being lower than the first.

10. The method of claim 8, further comprising:
resending the first message to the second device until a reply message is received by the first device.

11. The method of claim 8, wherein the first power state is a low power state with a high exit latency.

12. The method of claim 8, further comprising:
blocking a scheduling of a transaction from the first device to the second device.

13. The method of claim 8, wherein the second condition includes confirmation of receipt of transmitted data from the second device.

14. The method of claim 8, further comprising:
altering a power state of the second communication channel to the first power state.

15. The method of claim 14, wherein the third condition includes detecting the first power state in at least the first communication channel.

16. A method comprising:
detecting a first condition in a first device coupled to a first communication channel;
altering a power state of a first portion of the first communication channel to an active state;
detecting an active state in the first portion of the first communication channel in a second device;
altering a power state of a second portion of the first communication channel to an active state; and
detecting the active state of the first portion of the second communication channel by a third device.

17. The method of claim 16, wherein the first condition is a request for data to be transmitted by the first device.

18. The method of claim 16, further comprising:
altering a power state of a first portion of a second communication channel to an active state.

19. The method of claim 18, further comprising:
altering a power state of a second portion of the second communication channel to an active state.

20. An apparatus comprising:
a first communication channel having a first portion and a second portion each supporting a first power state and a second power state;
a first device coupled to the first communication channel to transmit data over the first portion of the first communication channel in a first power state, the first device to alter the power state of the first portion of the first communication channel upon detecting a first condition; and
a second device coupled to the first communication channel to transmit data over the second portion of the first communication channel in a first power state;
a second communication channel coupled to the second device having a first portion and a second portion each having a first power state and a second power state; and
a third device coupled to the second communication channel to transmit data over the second portion of the second communication channel, the third device to alter the power state of the second portion of the second communication channel upon detecting a second condition,
wherein the first power state is a reduced power state in relation to the second power state.

21. The apparatus of claim 20, wherein the second device alters the power state of the first portion of the second communication channel upon detecting the second power state in the first portion of the first communication channel.

22. The apparatus of claim 20, further comprising:
a plurality of communication channels coupled to the second device, the second device to alter the power state of the second portion of the first communication channel upon detecting a first power state in any of the plurality of communication channels.

23. An apparatus comprising:
a first communication channel having a first portion and a second portion each having a first power state and a second power state;
a first device coupled to the first communication channel to transmit data over the first portion of the first communication channel in a first power state, the first device to alter the power state of the first portion of the first communication channel upon detecting a first condition;
a second device coupled to the first communication channel to transmit data over the second portion of the first communication channel in a first power state;
a central processing unit coupled to the first device; and
a memory device coupled to the first device; and
a third device coupled to the second device by a second communication channel having a first portion and a second portion each having a first power state and a second power state, the third device to alter the power state of the second portion of the second communication channel upon detecting a second condition,
wherein the second power state is a reduced power state in relation to the first power state.

24. The apparatus of claim 23, wherein the first device alters the power state of the first portion of the second communication channel upon detecting the first power state in the second portion of the first communication channel.

25. The apparatus of claim 23, further comprising:
a plurality of communication channels coupled to the first device, the second device alters the power state of the second portion of the first communication channel upon detecting a first power state in any of the plurality of communication channels.

26. An apparatus comprising:
   first means for communicating having a first portion and a second portion each having a first power state and a second power state;
   first means for transmitting coupled to the first means for communicating to transmit data over the first portion of the first means for communicating in a first power state, the first means for transmitting to alter the power state of the first portion of the first communication means upon detecting a first condition;
   second means for transmitting coupled to the first means for communication to transmit data over the second portion of the first means for communicating means in a first power state;
   second means for communicating coupled to the second means for transmitting having a first portion and a second portion each having a first power state and a second power state;
   third means for transmitting coupled to the second means for communicating to transmit data over the second portion of the second means for communicating, the third means for transmitting to alter the power state of the second portion of the second means for communicating upon detecting a second condition.

27. The apparatus of claim 26, wherein the second means for transmitting alters the power state of the first portion of the second means for communicating upon detecting the second power state in the first portion of the first means for communicating.

28. A machine-readable medium that provides instructions, which when executed by a machine cause the machine to perform operations comprising:
   detecting a condition in a first device, the first device coupled to a first communication channel in an first power state, the first communication channel having a first portion and a second portion; and
   altering the power state of the first portion of the first communication channel to a second power state, wherein the condition is a first portion of the first communication channel that is idle for two symbol periods.

29. The machine-readable medium of claim 28, further comprising:
   detecting the second power state of the first portion of the first communication channel by a second device; and
   altering the power state of a first portion of a second communication channel to the second power state.

30. The machine-readable medium of claim 28, further comprising:
   detecting the second power state of a first portion of each of a plurality of communication channels by a second device.

31. The machine-readable medium of claim 28, further comprising:
   altering the power state of a first portion of a second communication channel to a second power state.

32. The machine-readable medium of claim 28, wherein the second power state is an active power state.

33. The machine-readable medium of claim 32, further comprising:
   detecting the second power state of the first portion of the first communication channel by a second device; and
   altering the power state of a first portion of a second communication channel to the second power state.

34. A machine-readable medium that provides instructions, which when executed by a machine cause the machine to perform operations comprising:
   detecting a first condition in a first device coupled to a first communication channel;
   sending a first message to a second device coupled to a first communication channel;
   detecting a second condition in the second device;
   sending a second message from the second device to the first device;
   altering the power state of a first portion and a second portion of the first communication channel to a first power state;
   detecting a third condition in the second device, the second device coupled to a second communication channel; and
   sending a third message to a third device coupled to the second communication channel.

35. The machine-readable medium of claim 34, further comprising:
   blocking a scheduling of transactions from the first device to the second device.

36. The machine-readable medium of claim 34, further comprising:
   altering a power state of the second communication channel to the first power state.

37. A machine-readable medium that provides instructions, which when executed by a machine cause the machine to perform operations comprising:
   detecting a first condition in a first device coupled to a first communication channel;
   altering a power state of a first portion of the first communication channel to an active state;
   detecting an active state in the first portion of the first communication channel in a second device;
   altering a power state of a second portion of the first communication channel to an active state; and
   detecting the active state of the first portion of the second communication channel by a third device.

38. The machine-readable medium of claim 37, further comprising:
   altering a power state of a first portion of a second communication channel to an active state.

39. The machine-readable medium of claim 37, further comprising:
   altering a power state of a second portion of the second communication channel to an active state.

* * * * *

UNITED STATES PATENT AND TRADEMARK OFFICE
CERTIFICATE OF CORRECTION

PATENT NO. : 7,137,018 B2 Page 1 of 1
APPLICATION NO. : 10/335111
DATED : November 14, 2006
INVENTOR(S) : Gutman et al.

It is certified that error appears in the above-identified patent and that said Letters Patent is hereby corrected as shown below:

Column 5, at line 37, delete "and" and insert --an--.

Column 8, at line 24, delete "and" and insert --an--.

Column 8, at line 42, delete "and" and insert --an--.

Signed and Sealed this

Thirteenth Day of November, 2007

JON W. DUDAS
*Director of the United States Patent and Trademark Office*